United States Patent
Kang et al.

(10) Patent No.: US 8,809,467 B2
(45) Date of Patent: Aug. 19, 2014

(54) ORGANIC LAYER COMPOSITION AND LIQUID CRYSTAL DISPLAY USING THE SAME

(75) Inventors: Hoon Kang, Suwon-si (KR); Jae-Sung Kim, Yongin-si (KR); Yang-Ho Jung, Yongin-si (KR); Jin-Ho Ju, Seoul (KR); Doo-Hee Jung, Seoul (KR); Jung-In Park, Suwon-si (KR); Shi-Yul Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 444 days.

(21) Appl. No.: 12/723,419

(22) Filed: Mar. 12, 2010

(65) Prior Publication Data

US 2011/0051059 A1    Mar. 3, 2011

(30) Foreign Application Priority Data

Sep. 2, 2009    (KR) ........................ 10-2009-0082540

(51) Int. Cl.
*C08G 59/00* (2006.01)
(52) U.S. Cl.
USPC ........................................ 525/418; 349/187
(58) Field of Classification Search
USPC .......................................... 349/187; 525/418
See application file for complete search history.

(56) References Cited

U.S. PATENT DOCUMENTS

| | | | | |
|---|---|---|---|---|
| 3,755,272 A | * | 8/1973 | Blank | 526/87 |
| 4,593,068 A | * | 6/1986 | Hirose et al. | 525/100 |
| 5,418,094 A | * | 5/1995 | Sato et al. | 430/7 |
| 7,787,168 B2 | * | 8/2010 | Park | 359/259 |
| 2002/0032250 A1 | * | 3/2002 | Okazaki et al. | 522/83 |
| 2005/0266339 A1 | * | 12/2005 | Lee et al. | 430/270.1 |
| 2006/0027783 A1 | * | 2/2006 | Kokeguchi et al. | 252/299.01 |
| 2009/0076233 A1 | * | 3/2009 | Kaneko et al. | 526/206 |

FOREIGN PATENT DOCUMENTS

| | | |
|---|---|---|
| CN | 1625702 A | 6/2005 |
| CN | 101392154 A | 3/2009 |
| JP | 2008129193 A | 6/2008 |
| JP | 2008129482 A | 6/2008 |
| JP | 2008158187 A | 7/2008 |
| JP | 2008176304 A | 7/2008 |
| JP | 2008262074 A | 10/2008 |
| JP | 2009048062 A | 3/2009 |
| KR | 1020050047890 A | 5/2005 |

* cited by examiner

Primary Examiner — Phu Vu
(74) Attorney, Agent, or Firm — Innovation Counsel LLP

(57) ABSTRACT

An organic layer composition and a liquid crystal display including the same are provided. An organic layer composition according to an exemplary embodiment includes a binder formed by copolymerizing compounds included in a first group and a second group, wherein the first group includes an acryl-based compound and the second group includes a compound without a —COO— group.

25 Claims, 4 Drawing Sheets

ORGANIC LAYER COMPOSITION AND LIQUID CRYSTAL DISPLAY USING THE SAME

CROSS-REFERENCE TO RELATED APPLICATION

This application claims priority to and the benefit of Korean Patent Application No. 10-2009-0082540 filed in the Korean Intellectual Property Office on Sep. 2, 2009, the entire contents of which are incorporated herein by reference.

BACKGROUND OF THE INVENTION (a) Field of the Invention

The present invention relates to an organic layer composition and a liquid crystal display including the same.

(b) Description of the Related Art

One of the most widely used flat panel displays, a liquid crystal display (LCD), includes two display panels, each provided with field generating electrodes such as pixel electrodes and a common electrode, and a liquid crystal (LC) layer interposed therebetween. The LCD displays images by applying voltages to the field-generating electrodes on the display panels to generate an electric field across the LC layer. The electric field across the LC layer determines the orientation of LC molecules therein to adjust polarization of incident light.

Among LCDs, a vertical alignment (VA) mode LCD, which aligns LC molecules such that their long axes are perpendicular to the panels in the absence of an electric field, is receiving attention because of its high contrast ratio and wide reference viewing angle.

In vertical alignment (VA) mode LCDs, the wide viewing angle may be obtained by forming, in a single pixel, a plurality of domains in which the alignment directions of the liquid crystal molecules are different.

To form the plurality of domains in a single pixel, methods in which a small slit or a cutout is formed in the field generating electrodes, or a protrusion is formed on the field generating electrodes, have been proposed. In these methods, the plurality of domains may be formed by aligning the liquid crystal molecules vertically with respect to a fringe field generated between the edges of the cutout or the protrusion and the field generating electrodes facing the edges.

On the other hand, vertical alignment (VA) mode LCDs have lower side visibility as compared to their front visibility. To solve this problem a single pixel is divided into two subpixels, and different voltages are applied to the subpixels.

The above information disclosed in this Background section is only for enhancement of understanding of the background of the invention and therefore it may contain information that does not form the prior art that is already known to a person of ordinary skill in the art.

SUMMARY OF THE INVENTION

In one aspect a pre-tilt angle of a liquid crystal layer is formed by hardening an alignment aid agent included in the liquid crystal layer by ultraviolet rays to form a plurality of domains, and prevents damage to an organic layer thereunder due to the ultraviolet rays when hardening the liquid crystal layer by ultraviolet rays.

An organic layer composition according to another aspect includes a binder formed by copolymerizing compounds including a first group and a second group, wherein the first group includes an acryl-based compound and the second group includes a compound without a —COO— group.

The first group may include at least one of compounds represented by Formula 1 to Formula 5, and the second group may includes at least one of styrene, an imide, an acid dianhydride including an aliphatic ring, norbornene, an olefin-based compound, a silicon-based compound, and a novolak-based compound.

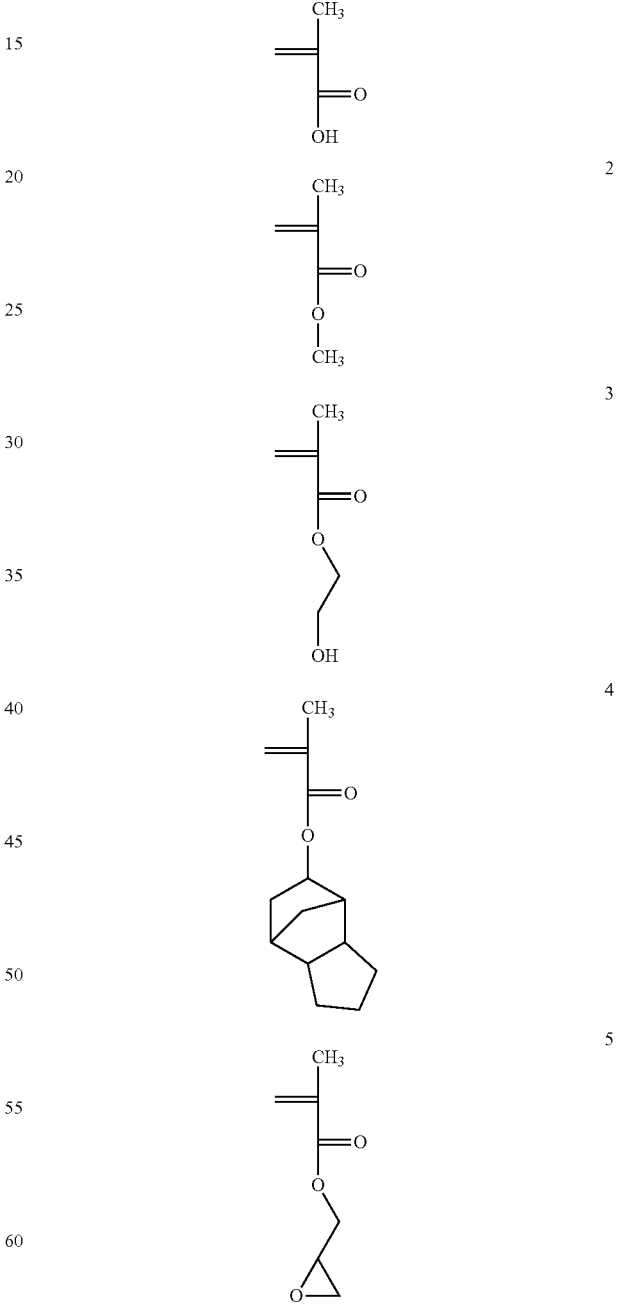

The acid dianhydride including the aliphatic ring may include at least one of the compounds represented by Formula 6 to Formula 8.

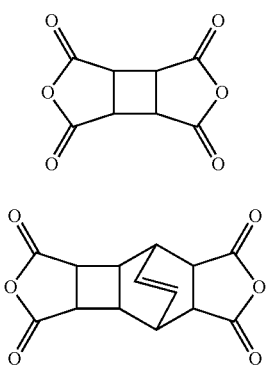

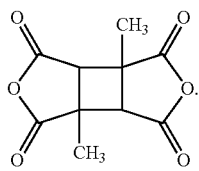

When the norbornene is polymerized, and a unit monomer of the binder may include at least one of compounds represented by Formula 9 to Formula 12.

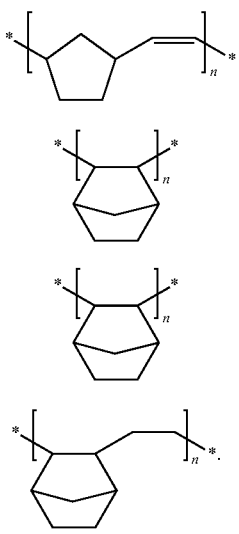

The silicon-based compound may include siloxane or silsesquioxane.

The olefin-based compound may be a compound represented by Formula 13.

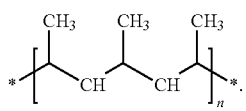

The imide may include a compound represented by Formula 14.

Formula 14

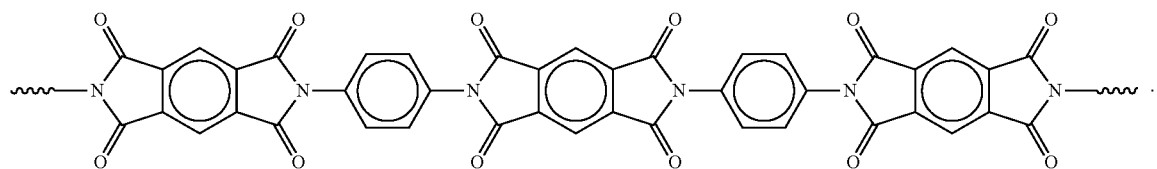

The novolak-based compound may include at least one of cresol, xylenol, and trimethylphenol.

The concentration of the compound corresponding the second group included in the binder may be in the range of 5 to 80 wt %.

A liquid crystal display according to another exemplary embodiment of the present invention includes: a first substrate; a second substrate facing the first substrate; a thin film transistor disposed on the first substrate; an organic layer disposed on the thin film transistor; a pixel electrode disposed on the organic layer; and a common electrode disposed on the second substrate, wherein the organic layer includes a light absorption agent added to a binder including an acryl-based copolymer, and the light absorption agent includes at least one of a cinnamic acid derivative, a benzophenone derivative, an oxalanilide derivative, a benzotriazole derivative, and a triazine derivative.

The light absorption agent may include at least one of compounds represented by Formula 14 to Formula 18.

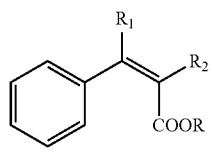

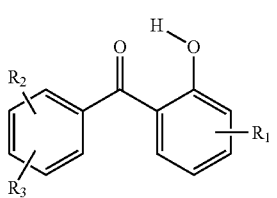

16

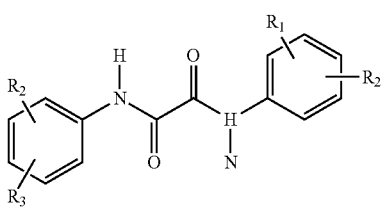

17

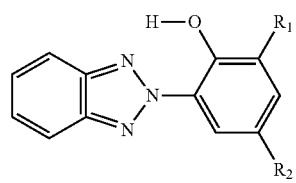

18

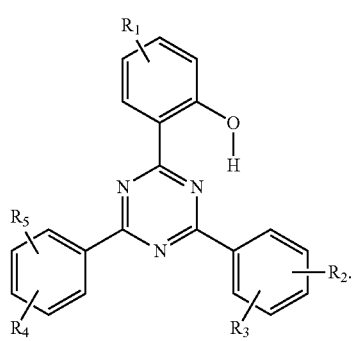

A liquid crystal layer interposed between the first substrate and the second substrate and having liquid crystal and an alignment polymer may be further included, wherein the alignment polymer may be formed by irradiating the liquid crystal and an alignment aid agent.

The light absorption agent may absorb the light irradiated to form the alignment polymer.

The light absorption agent may convert the absorbed light into heat through a reversible reaction.

The energy of the light used to irradiate the liquid crystal and the alignment aid agent may be in the range of 30 J/cm² to 100 J/cm².

A color filter disposed on the first substrate may be further included, and the organic layer may cover the color filter and the thin film transistor.

The color filter may include a light absorption agent, and the light absorption agent may include at least one of a cinnamic acid derivative, a benzophenone derivative, an oxalanilide derivative, a benzotriazole derivative, and a triazine derivative.

A black matrix disposed on the first substrate may be further included.

The black matrix may include a light absorption agent, and the light absorption agent may include at least one of a cinnamic acid derivative, a benzophenone derivative, an oxalanilide derivative, a benzotriazole derivative, and a triazine derivative.

The pixel electrode may include a plurality of small slits.

The binder may be formed by copolymerizing an acryl-based compound included in a first group and a compound included a second group without a —COO— group.

The first group may include at least one of compounds represented by Formula 1 to Formula 5.

1

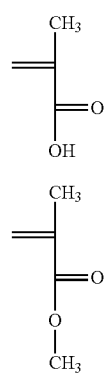

2

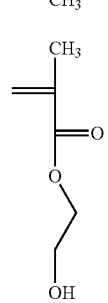

3

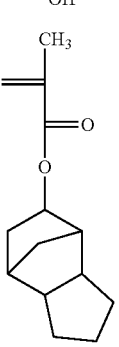

4

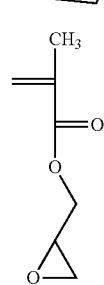

5

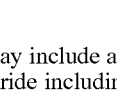

The second group may include at least one of styrene, an imide, an acid dianhydride including an aliphatic ring, norbornene, an olefin-based compound, a silicon-based compound, and a novolak-based compound.

A liquid crystal display according to another exemplary embodiment of the present invention includes: a first substrate; a second substrate facing the first substrate; a thin film transistor disposed on the first substrate; an organic layer disposed on the thin film transistor; a pixel electrode disposed on the organic layer; and a common electrode disposed on the second substrate, wherein the organic layer includes a binder formed by copolymerizing an acryl-based compound included in a first group and a compound without a —COO— group included in a second group.

The first group may include at least one of the compounds represented by Formula 1 to Formula 5, and the second group includes at least one of styrene, an imide, an acid dianhydride including an aliphatic ring, norbornene, an olefin-based compound, a silicon-based compound, and a novolak-based compound.

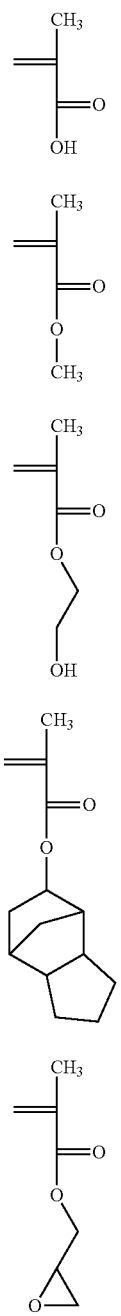

A liquid crystal layer interposed between the first substrate and the second substrate and including liquid crystal and an alignment polymer may be further included, and the alignment polymer may be formed by irradiating the liquid crystal and an alignment aid agent.

A color filter disposed on the first substrate may be further included, and the organic layer may cover the color filter and the thin film transistor.

The color filter may include a binder formed by copolymerizing an acryl-based compound included in a first group and a compound without a —COO— group included in a second group.

A black matrix disposed on the first substrate may be further included.

The black matrix may include a binder formed by copolymerizing an acryl-based compound included in a first group and a compound without a —COO— group included in a second group.

The pixel electrode may include a plurality of small slits.

According to the present invention, when ultraviolet rays harden the liquid crystal layer, deterioration of the liquid crystal due to gas generated by decomposition of the organic layer may be prevented.

DESCRIPTION OF REFERENCE NUMERALS INDICATING PRIMARY ELEMENTS IN THE DRAWINGS

Figure 1:
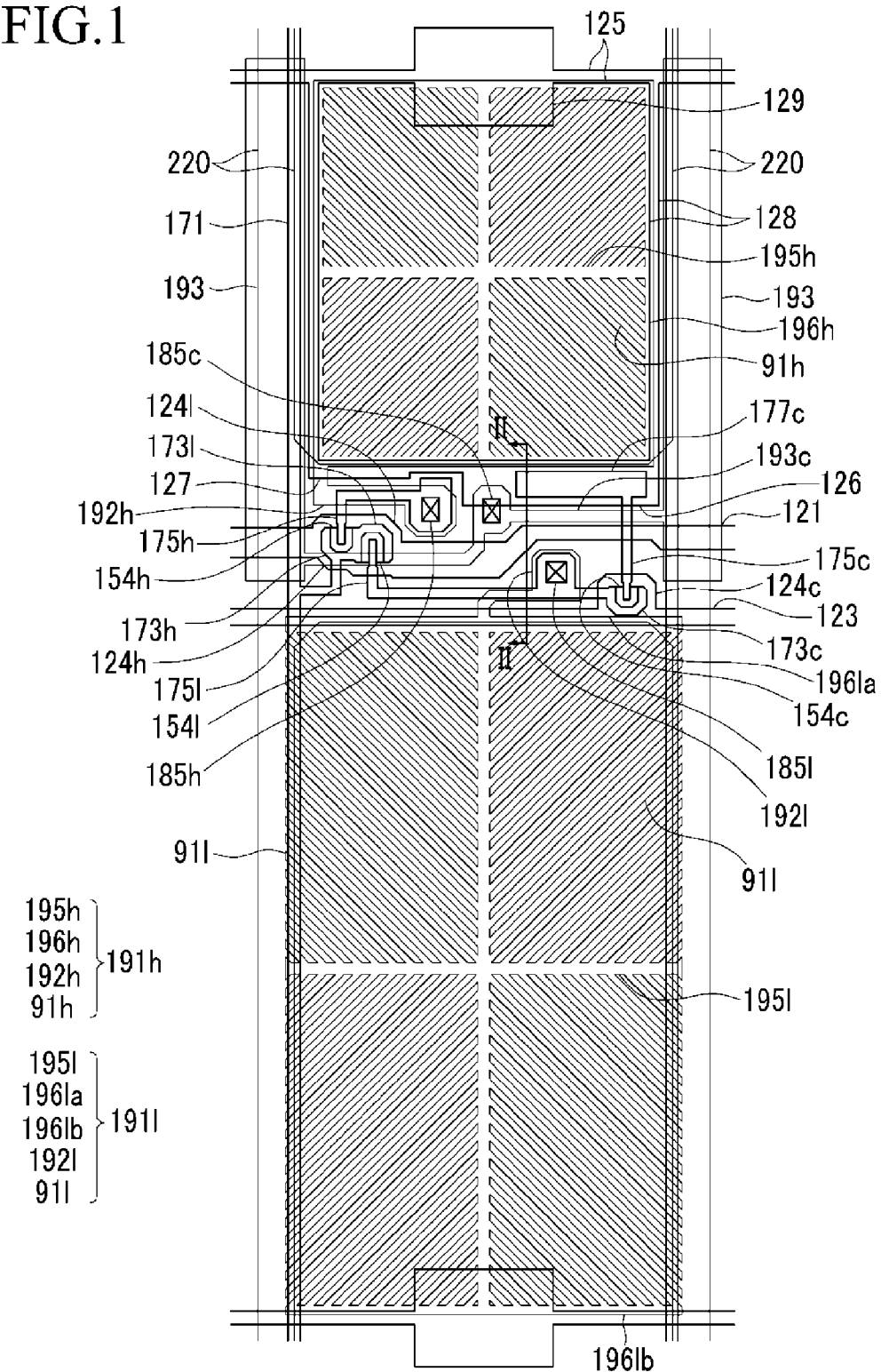
FIG. 1 is a layout view of a liquid crystal panel assembly according to an exemplary embodiment.

| | |
|---|---|
| 3: | liquid crystal layer |
| 100: | lower panel |
| 110, 210: | substrate |
| 121: | gate line |
| 123: | step-down gate line |
| 125: | storage electrode line |
| 140: | gate insulating layer |
| 151, 154, 154h, 154l, 154c: | semiconductor |
| 161, 163, 165, 163h, 165h: | ohmic contact |
| 171: | data line |
| 173, 173h, 173l, 173c: | source electrode |
| 175h, 175l, 175c: | drain electrode |
| 180p: | lower passivation layer |
| 180q: | upper passivation layer |
| 185, 185h, 185l: | contact hole |
| 191, 191h, 191l: | pixel electrode |
| 200: | upper panel |
| 220: | light blocking member |
| 230: | color filter |
| 270: | common electrode |

DETAILED DESCRIPTION OF THE EMBODIMENTS

The present invention will be described more fully hereinafter with reference to the accompanying drawings, in which exemplary embodiments are shown. However, the present invention is not limited to exemplary embodiments described herein, and may be embodied in other forms. Rather, exemplary embodiments described herein are provided to enhance understanding of the disclosed contents and to explain the ideas of the disclosure to a person of ordinary skill in the art.

In the drawings, the thicknesses of layers and regions are exaggerated for clarity. It is to be noted that when a layer is referred to as being "on" another layer or substrate, it can be directly formed on the other layer or substrate, or it can be formed on the other layer or substrate with a third layer interposed therebetween. Like constituent elements are denoted by like reference numerals throughout the specification.

Figure 2:
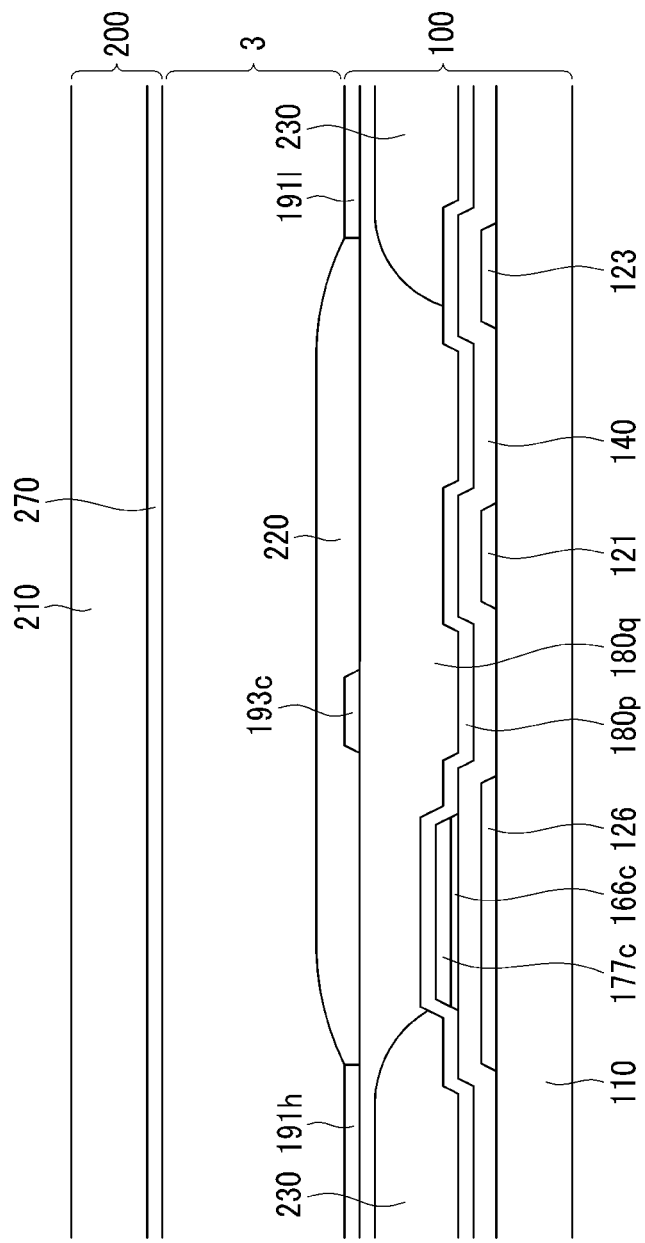
FIG. 2 is a cross-sectional view of the liquid crystal panel assembly shown in FIG. 1 taken along line II-II.

FIG. 1 is a layout view of a liquid crystal panel assembly according to an exemplary embodiment. FIG. 2 is a cross-sectional view of the liquid crystal panel assembly shown in FIG. 1 taken along line II-II.

A liquid crystal panel assembly according to the present exemplary embodiment includes a lower panel 100 and an upper panel 200 facing each other, and a liquid crystal layer 3 interposed between the two display panels 100 and 200. Polarizers (not shown) may be provided on the outer surface of the display panels 100 and 200.

First, the lower panel 100 will be described.

A plurality of gate conductors including a plurality of gate lines 121, a plurality of step-down gate lines 123, and a plurality of storage electrode lines 125 are formed on an insulation substrate 110.

The gate lines 121 and the step-down gate lines 123 transfer gate signals and mainly extend in a horizontal direction. Each gate line 121 includes a first gate electrode 124h and a second gate electrode 124l protruding upward and downward from the gate line 121 (in the layout view of FIG. 1), and each step-down gate line 123 includes a third gate electrode 124c protruding upward from the step-down gate line 123 (in the layout view of FIG. 1). The first gate electrode 124h and the second gate electrode 124l are connected to each other thereby forming a single protrusion from gateline 121.

The storage electrode lines 125 mainly extend in the horizontal direction and transfer a predetermined voltage, such as a common voltage Vcom. The storage electrode line 125 includes (i) a storage electrode 129 protruding upward and downward from the electrode line 125 (in the layout view of FIG. 1), (ii) a pair of longitudinal portions 128 extending vertically and downward from the gate line 121 along both sides of subpixel electrode 191h, and (iii) a transverse portion 127 connecting the ends of the pair of longitudinal portions 128 to each other. The transverse portion 127 includes a storage expansion 126 extending downward from the transverse portion 126 (in the layout view of FIG. 1).

A gate insulating layer 140 covering the gate conductors 121, 123, and 125 is formed on the gate conductor 121, 123, and 125.

A plurality of semiconductor stripes (not shown) made of hydrogenated amorphous silicon (a-Si), polysilicon, or similar material are formed on the gate insulating layer 140. The semiconductor stripes extend in a longitudinal direction and include branches that are formed at positions corresponding to the gate electrodes 124h, 124l, and 124c. That is, the semiconductor stripes include first and second semiconductors 154h and 154l extending toward the first and the second gate electrodes 124h and 124l, and positioned corresponding to the first and second gate electrodes 124h and 124l. Also, the semiconductor stripes include a third semiconductor 154c extending from the second semiconductor 154l and positioned corresponding to the third gate electrode 124c.

A plurality of ohmic contact stripes (not shown) are formed on the semiconductor stripes, and expose a portion of the semiconductor stripes at portions corresponding to the gate electrodes 124h, 124l, and 124c. That is, first ohmic contacts are formed on the first semiconductor 154h, and the semiconductor stripe is exposed between the first ohmic contacts. Also, second ohmic contacts and third ohmic contacts are respectively formed on the second semiconductors 154l and the third semiconductors 154c, and the semiconductor stripes are respectively exposed.

A data conductor including a plurality of data lines 171, a plurality of first drain electrodes 175h, a plurality of second drain electrodes 175l, and a plurality of third drain electrodes 175c is formed on the ohmic contacts.

The data lines 171 transmit data signals and extend in the longitudinal direction thereby intersecting the gate lines 121, the step-down gate lines 123, and the storage electrode lines 125. Each data line 171 includes a first source electrode 173h having a "U" shape and a second source electrode 173l having an inverted "U" shape. The first source electrode 173h and the second source electrode 173l are electrically connected to each other and share a common side.

The first drain electrode 175h has one end portion having a wide area and an elongated portion having a bent shape. The end of the elongated portion is enclosed by the first source electrode 173h, and the end portion having a wide area is wide enough to provide a space that is capable of contacting an upper layer.

The second drain electrode 175l includes an elongated portion with a bent shape on one end, a portion having a "U" shape at the opposite end, and a wide portion having a wide width. The end of the elongated portion is enclosed by the second source electrode 173l, and the end portion having the "U" shape forms the third source electrode 173c. Also, the wide portion provides an area that is wide enough to be capable of contacting the upper layer.

The third drain electrode 175c has an elongated portion that is straight, and not bent, and one end portion 177c having a wide area. The end of the elongated portion is enclosed by the third source electrode 175c, and the wide end portion 177c overlaps the storage expansion 126, thereby forming a step-down capacitor Cstd (described below with respect to FIG. 5).

The first to third gate electrodes 124h, 124l, and 124c, the first to third source electrodes 173h, 173l, and 173c, and the first to third drain electrodes 175h, 175l, and 175c form first, second, and third thin film transistors (TFT) Qh, Ql and Qc along with the first to third semiconductors 154h, 154l, and 154c. Here, the channels of the thin film transistors are respectively formed in the semiconductors 154h, 154l, and 154c between the source electrodes 173h, 173l, and 173c, and the drain electrodes 175h, 175l, and 175c. Each channel may be formed in the exposed region that is not covered by the ohmic contacts among the semiconductors 154h, 154l, and 154c.

Also, the semiconductor stripes including the semiconductors 154h, 154l, and 154c, except for the channel region between the source electrodes 173h, 173l, and 173c and the drain electrodes 175h, 175l, and 175c, have substantially the same area as the data conductor 171, 175h, 175l, and 175c, and the underlying ohmic contacts 161 and 165h. The semiconductor stripes including the semiconductors 154h, 154l, and 154c have a portion that is exposed without being covered by the data conductors 171, 175h, 175l, and 175c, and a portion between the source electrodes 173h, 173l, and 173c and the drain electrodes 175h, 175l, and 175c.

A lower passivation layer 180p made of an inorganic insulator such as silicon nitride or silicon oxide is formed on the data conductors 171, 175h, 175l, 175c and the exposed semiconductors 154h, 154l, and 154c.

A color filter 230 is formed on the lower passivation layer 180p. The color filter 230 is formed in most of the region except for the locations where the first thin film transistor (Qh), the second thin film transistor (Ql), and the third thin film transistor (Qc) are positioned. Each color filter 230 may display one of the primary colors, such as the three primary colors of red, green, and blue. Also, each color filter 230 may be formed in the longitudinal direction between the neighboring data lines 171, and color filters 230 of the same color typically are not formed next to each other.

An upper passivation layer 180$q$ made of an organic material is formed on the lower passivation layer 180$p$ and the color filter 230.

The upper passivation layer 180$q$ according to an exemplary embodiment includes a binder that is formed by copolymerizing compounds respectively corresponding to a first group that includes an acryl-based compound, and a second group, that includes a compound without an —COO— group. The binder functions as a main body in the organic layer, and may control physical or chemical characteristics of the organic layer. More details of the first group and the second group are described below.

The upper passivation layer 180$q$ may further include a photoresist, a surfactant, a solvent, and an adherence improver as well as the binder.

The first group may include at least one of the compounds represented by Formula 1 to Formula 5.

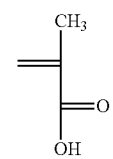
1

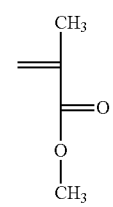
2

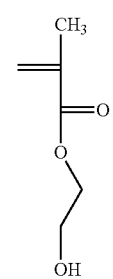
3

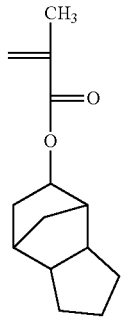
4

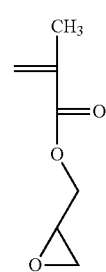
5

The second group may include at least one of styrene, an imide, an acid dianhydride including an aliphatic ring, norbornene, an olefin-based compound, a silicon-based compound, and/or a novolak-based compound.

The acid dianhydride including the aliphatic ring of the second group may include at least one of compounds represented by Formula 6 through Formula 8.

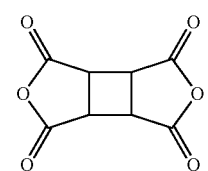
6

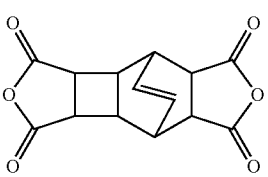
7

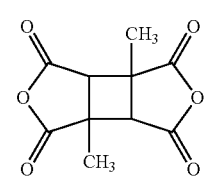
8

The norbornene of the second group may include at least one unit construct (monomer) of compounds represented by Formula 9 through Formula 12 in the binder

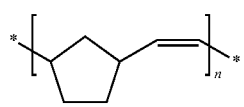
9

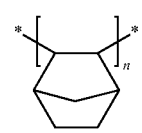
10

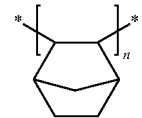
11

-continued

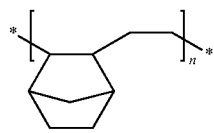
12

The silicon-based compound of the second group may include siloxane or silsesquioxane.

The olefin-based compound of the second group may include a compound represented by Formula 13.

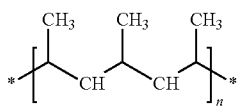
13

The novolak-based compound of the second group may include at least one of cresol, xylenol, and/or trimethylphenol.

The concentration of the compound included in the binder from the second group may be in the range of 5 to 80 wt %. The effect of the compound of the second group in the binder according to the present exemplary embodiment is to prevent deterioration of the liquid crystal. If the concentration of the compound from the second group is less than 5 wt %, this effect is small. On the other hand, if the concentration of the compound from the second group is more than 80 wt %, development of the organic layer in the patterning process becomes difficult.

The binder may also include a compound represented by Formula A in addition to compounds from the first group and the second group.

Formula A

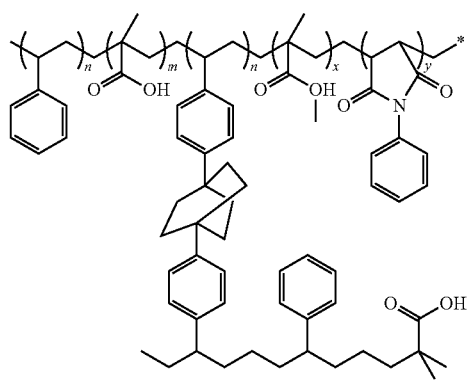

In another exemplary embodiment, the upper passivation layer 180q includes a light absorption agent in the binder.

The light absorption agent includes at least one of a cinnamic acid derivative, a benzophenone derivative, an oxalanilide derivative, a benzotriazole derivative, and a triazine derivative.

The light absorption agent includes at least one of the compounds represented by Formula 14 through Formula 18.

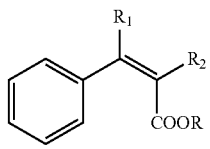
14

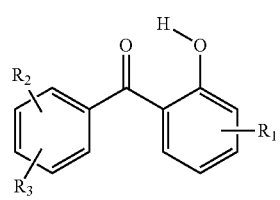
15

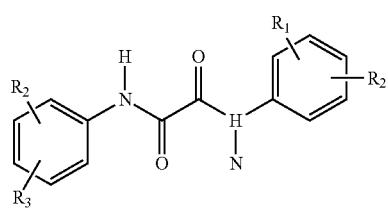
16

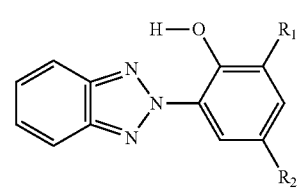
17

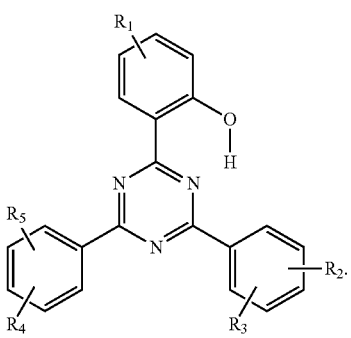
18

The light absorption agent according to the present exemplary embodiment may absorb ultraviolet rays that are used in forming the alignment polymer included in the liquid crystal layer, which is described in more detail below.

The light absorption agent may convert the absorbed light into heat through a reversible reaction.

The exemplary embodiment of forming the binder by copolymerizing the compounds included in the above-described first group and second group, and the exemplary embodiment of adding the light absorption agent to the binder may be applied to different constituent elements of the liquid crystal display that include another organic material, as well as to the color filter 230 and a light blocking member 220. Also, they are not limited to use in the liquid crystal display, and may be applied to different electrical devices.

The lower passivation layer 180p and the upper passivation layer 180q have a first contact hole 185h exposing the wide end portion of the first drain electrode 175h, and a second contact hole 185l exposing the wide portion of the second drain electrode 175l. Also, the passivation layers 180p and 180q have a third contact hole 185c exposing the region that is the upper portion of the storage expansion 126, and does not overlap the wide end portion 177c of the third drain electrode 175c.

A pixel electrode that includes a first subpixel electrode 191h and a second sub-pixel electrode 191l, and a shielding electrode 193 are formed on the upper passivation layer 180q.

The first and second sub-pixel electrodes 191h and 191l neighbor each other in the column direction. The height of the second sub-pixel electrode 191l may be about one to three times the height of the first sub-pixel electrode 191h.

The entire shape of the first sub-pixel electrode 191h is a quadrangle, and includes the cross stems 195h, including a transverse stem and a longitudinal stem which cross each other in the first sub-pixel electrode 191h, an outer stem 196h, enclosing the periphery of the first sub-pixel electrode 191h, and a protrusion 192h protruded downward from the lower portion of the outer stem 196h to be electrically connected to the first drain electrode 175h through the first contact hole 185h. Also, a first small branch electrode 91h, of which one end is connected to the cross stem 195h and the other end is connected to the outer stem 196h, and which extends in the oblique direction, is further included. The cross stems 195h represent areas on the first sub-pixel electrode 191h in which there are no small branch electrodes 91h.

The entire shape of the second sub-pixel electrode 191l is also a quadrangle, and includes a cross stems 195l, including a transverse stem and a longitudinal stem which cross each other in the second sub-pixel electrode 191l, an upper transverse portion 196la, a lower transverse portion 196lb, and a protrusion 192l that protrudes upward from the upper portion of the upper transverse portion 196la to be electrically connected to the second drain electrode 175l through the second contact hole 185l. Also, a second small branch electrode 91l, of which one end is connected to the cross stem 195l and which extends in the oblique direction, is further included. The cross stems 195l represent areas on the second sub-pixel electrode 191l in which there are no small branch electrodes 91l.

The first sub-pixel electrode 191h and the second sub-pixel electrode 191l are respectively divided into four sub-regions by the cross stems 195h and 195l. Each sub-region includes a plurality of small branch electrodes 91h and 91l obliquely extending from the cross stems 195h and 195l. The small branch electrodes 91h and 91l of each sub-region form a slit pattern, and the small branch electrodes 91h and 91l may be at an angle of about 45 or 135 degrees with respect to the gate line 121. The small branch electrodes 91h and 91l of neighboring sub-regions may be oriented in opposing directions.

The protrusion 192h of the first sub-pixel electrode 191h receives the data voltage from the first drain electrode 175h through the first contact hole 185h, and the protrusion 192l of the second sub-pixel electrode 191l receives the data voltage from the second drain electrode 175l through the second contact hole 185l. The data voltage applied to the second sub-pixel electrode 191l may be less than the data voltage applied to the first sub-pixel electrode 191h.

On the other hand, the shielding electrode 193 is electrically connected to the storage expansion 126 through the third contact hole 185c, thereby receiving a predetermined voltage, such as a common voltage Vcom, applied to the storage expansion 126. The shielding electrode 193 covers a portion of the data line 171, thereby electrically blocking the data line 171, and accordingly signal delay by the coupling may be prevented. On the other hand, the shielding electrode 193 is connected to the storage expansion 126 such that it may have the function of increasing the storage capacitance of the pixel.

A light blocking member 220 is formed on a region that the color filter 230 does not occupy and a region overlapping a portion of the color filter 230. The light blocking member 220 is disposed on the upper insulating layer 180q, and is formed on the shielding electrode 193, thereby preventing light leakage. The light blocking member 220 includes a portion covering the region where the first thin film transistor Qh, the second thin film transistor Ql, and the third thin film transistor Qc are disposed, and a portion extending vertically along the data line 171.

An alignment layer (not shown) may be formed on the first and second sub-pixel electrodes 191h and 191l and the light blocking member 220.

When a data voltage is applied to the first and second sub-pixel electrodes 191h and 191l, the subpixel electrodes form an electric field along with a common electrode 270 of the upper panel 200. The electric field that is formed determines the direction that the liquid crystal molecules are aligned in the liquid crystal layer 3 between the two electrodes 191 and 270. The polarization of light that is incident to the liquid crystal layer 3 is changed according to the inclination degree of the liquid crystal molecules, and this change of polarization appears as a change of transmittance by the polarizer, thereby displaying images of the liquid crystal display.

The first and second sub-pixel electrodes 191h and 191l of an exemplary embodiment each include four sub-regions having slits 91h and 91l oriented in different directions such that the liquid crystal molecules in liquid crystal layer 3 are inclined in all four directions. Therefore, the viewing angle of the liquid crystal display is widened by varying the inclined directions of the liquid crystal molecules.

The first sub-pixel electrode 191h and the common electrode 270 form a first liquid crystal capacitor Clch along with the liquid crystal layer 3 interposed therebetween, and the second sub-pixel electrode 191l and common electrode 270 form a second liquid crystal capacitor Clcl along with the liquid crystal layer 3 interposed therebetween, thereby maintaining the voltage after the first and second thin film transistors Qh and Ql are turned off.

The first and second sub-pixel electrodes 191h and 191l overlap the storage electrode line 125 as well as the storage electrode 129, thereby forming first and second storage capacitors Csth and Cstl, and the first and second storage capacitors Csth and Cstl enhance the voltage storage capacity of the first and second liquid crystal capacitors Clch and Clcl.

In an exemplary embodiment, the voltage of the first sub-pixel electrode 191h and the second sub-pixel electrode 191l may be changed. If the voltages of the first and second sub-pixel electrodes 191h and 191l are different, the voltages applied to the first and second liquid crystal capacitors Clch and Clcl are different, and thus the luminance of the sub-pixels are also different. Accordingly, the voltages of the first and second liquid crystal capacitors Clca and Clcb are appropriately controlled, thereby improving the lateral visibility.

The operation by which the voltages of the first sub-pixel electrode 191h and the second sub-pixel electrode 191l are changed will be described below.

Next, the upper panel 200 will be described.

A common electrode 270 is formed on the whole surface of a transparent insulation substrate 210 in the upper panel 200. The common electrode 270 may be made of the transparent conductor such as ITO and IZO. An alignment layer (not shown) may be formed on the common electrode 270, and may be a vertical alignment layer.

Polarizers (not shown) may be provided on the outer surfaces of the lower panel 100 and the upper panel 200.

Figure 3:
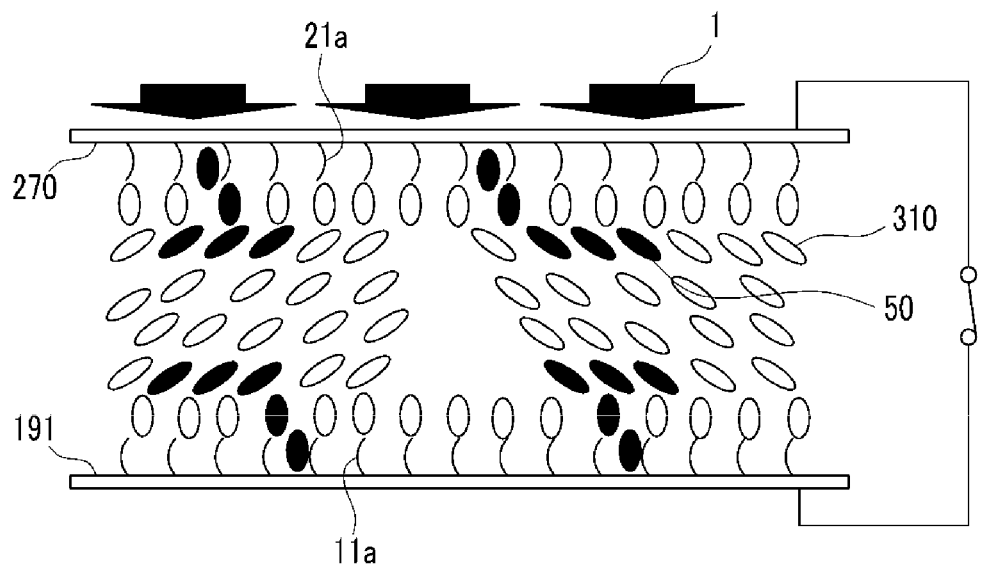
FIG. 3 and FIG. 4 are schematic diagrams showing a method for forming a pre-tilt angle of a liquid crystal by an alignment aid according to an exemplary embodiment of the present invention.
Figure 4:
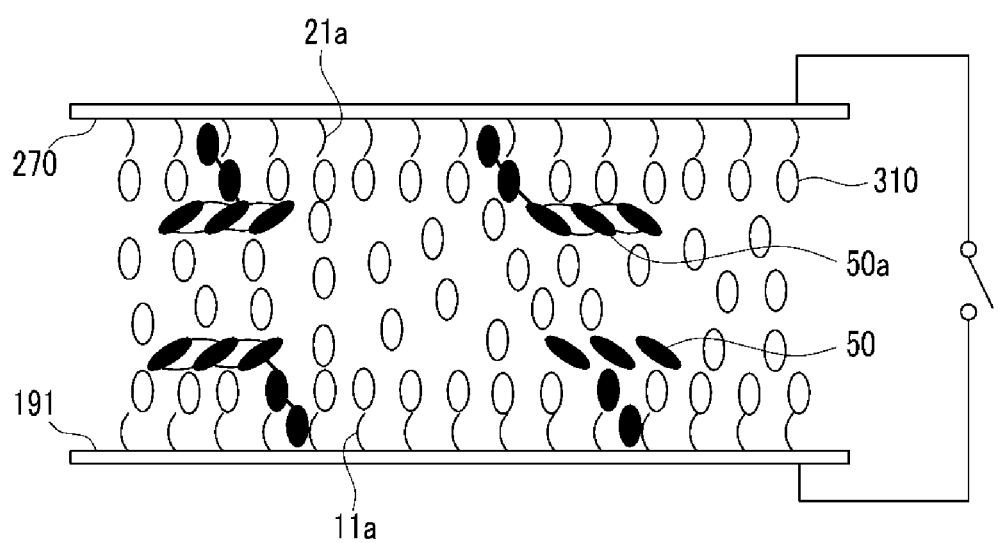

Referring to FIGS. 3 and 4, liquid crystal molecules 310 between the lower and upper display panels 100 and 200 have negative dielectric anisotropy, and may be oriented such that the major axes thereof are almost perpendicular to the surfaces of the two display panels 100 and 200 when no electric field is applied.

The liquid crystal layer 3 includes an alignment polymer that is formed by irradiating the liquid crystal and an alignment aid agent 50, described below, with light. For such process, the energy of the light used for irradiating the liquid crystal and the alignment aid agent 50 may be 30 J/cm$^2$ to 100 J/cm$^2$.

If voltages are applied to the pixel electrode 191 and the common electrode 270, the liquid crystal molecules 310 respond to the electric field generated between the pixel electrode 191 and the common electrode 270, such that the long axes thereof tend to be perpendicular to the electric field direction. The polarization of the light that is incident to the liquid crystal layer 3 is changed according to the inclination degree of the liquid crystal molecules 310, and this change of polarization appears as a change of transmittance by the polarizer, thereby displaying images of the liquid crystal display.

An alignment polymer formed by the polymerization of the alignment aid agent 50 has a function of controlling the pre-tilt angle (i.e., an initial alignment direction) of the liquid crystal molecules 310. The alignment aid agent 50 may be a general reactive mesogen.

The alignment aid agent 50 has a similar shape to the liquid crystal molecules, and includes a core group forming a core axis and a terminal group connected thereto.

The alignment aid agent has the mesogen as the core group and a polymerizable group, such as a photo-polymerizable group, as the terminal group.

The mesogen includes a structure in which two or more aromatic or aliphatic cyclic compounds are connected to each other at the center thereof, and for example may include one selected from a naphthalene group represented by Formula A, a biphenyl group represented by Formula B, or a bisphenol A group represented by Formula C.

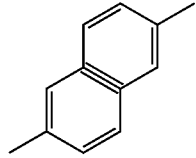
[Formula A]

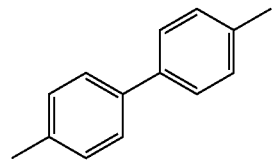
[Formula B]

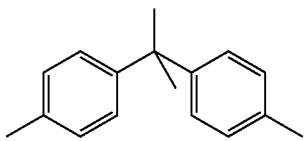
[Formula C]

A photo-polymerizable group is a functional group that is able to be polymerized by light, and for example may include one selected from an acryl group represented by Formula F or a methacryl group represented by Formula G.

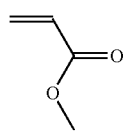
[Formula F]

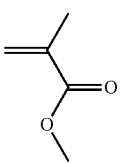
[Formula G]

Also, the alignment aid agent 50 may further include a chain alkyl group having 3 to 12 carbon atoms disposed between the mesogen and the polymerizable group. The chain alkyl group is disposed between the mesogen and the polymerizable group, thereby controlling a chain length such that it increases the polymerization degree when the alignment aid is polymerized, for instance when the alignment aid having a terminal group which is photo-polymerizable receives light.

The alignment aid agent which is polymerized by light will be described with reference to FIG. 1 to FIG. 4.

FIG. 3 and FIG. 4 are schematic diagrams showing a method for forming a pre-tilt angle of liquid crystal molecules through an alignment aid agent according to an exemplary embodiment.

First, a lower panel 100 and an upper panel 200 are respectively manufactured.

The lower panel 100 is manufactured through the following method.

A plurality of thin films are deposited on an insulating substrate 110, and are patterned to sequentially form a plurality of gate conductors including a plurality of gate lines 121, a plurality of step-down gate lines 123, and a plurality of storage electrodes lines 125, a gate insulating layer 140, a semiconductor stripe 151, a data line 171 including source electrodes 173h, 173l, and 173c, drain electrodes 175h, 175l, and 175c, and a lower passivation layer 180p.

Next, a color filter 230 is formed on the lower passivation layer 180p, and an upper passivation layer 180q made of an organic material is formed on the lower passivation layer 180p and the color filter 230.

A conductive layer such as ITO or IZO is deposited and patterned on the upper passivation layer 180q to form a pixel electrode 191.

A light blocking member 220 is formed so that it is positioned on the region that the color filter 230 does not occupy and the region overlapping edge portions of the color filter 230.

Next, an alignment layer (not shown) is coated on the pixel electrode 191

The upper panel 200 is manufactured through the following method.

A common electrode 270 is formed on an insulation substrate 210. Next, an alignment layer (not shown) is coated on the common electrode 270.

Next, the lower panel 100 and the upper panel 200 that are manufactured through the above-described method are assembled, and a liquid crystal layer 3 is formed by injecting a mixture of liquid crystal molecules 310 and the above-described alignment aid agent 50 therebetween. However, the liquid crystal layer 3 may alternatively be formed by a method in which a mixture of the liquid crystal molecules 310 and the alignment aid agent 50 is dripped on the lower panel 100 or the upper panel 200.

Next, referring to FIG. 3, voltages are applied to the pixel electrode 191 and the common electrode 270. The liquid crystal molecules 310 and the alignment aid agent 50 are inclined in a direction parallel to the length direction of the small branch electrodes of the pixel electrode 191 by the application of voltages. The liquid crystal molecules 310 near the alignment layer maintain vertical alignment by a chain 11a, 21a of the alignment layer.

A first light 1 is used to irradiate the liquid crystal panel assembly in a state in which the voltages are applied between the pixel electrode 191 and common electrode 270. The first light has a wavelength that can polymerize the alignment aid agent 50, such as ultraviolet rays. Here, the first light energy may be in the range of 30 $J/cm^2$ to 100 $J/cm^2$.

Accordingly, the alignment aid agent 50 that is agglomerated is polymerized to form a polymer 50a. The polymer 50a can control the pre-tilt angle of the liquid crystal molecules 310.

Next, as shown in FIG. 4, the voltages between the pixel electrode 191 and the common electrode 270 are turned off.

Next, light is used to irradiate the liquid crystal layer 3 in a state in which the voltages between the pixel electrode 191 and the common electrode 270 are turned off, thereby increasing the polymerization ratio of the polymer 50a.

The liquid crystal layer 3 will include both the polymerized polymer 50a and any alignment aid agent 50 that is not polymerized. However, the alignment aid agent 50 according to exemplary embodiments herein, has a relatively high degree of polymerization reactivity, such that the remaining amount of non-polymerized alignment aid in the liquid crystal layer 3 may be reduced.

As described above, when short wavelength ultraviolet rays are used to irradiated the liquid crystal layer 3, and the alignment aid agent 50 is thereby polymerized to form the alignment polymer 50a, an ester group included in the acryl group of the organic layer is decomposed such that a gas, such as CO or $CO_2$, may be generated. The generated gas is diffused in the liquid crystal layer, which may create a region in the liquid crystal layer that is not filled by the liquid crystal.

According to an exemplary embodiment, the amount of the ester group that generates the gas is reduced, and the light absorption agent added to the organic layer absorbs the light that is irradiated for the hardening of the alignment aid agent 50.

Next, a circuit structure and an operation of a liquid crystal display according to an exemplary embodiment will be described with reference to FIG. 1 and FIG. 2 and FIG. 5.

Figure 5:
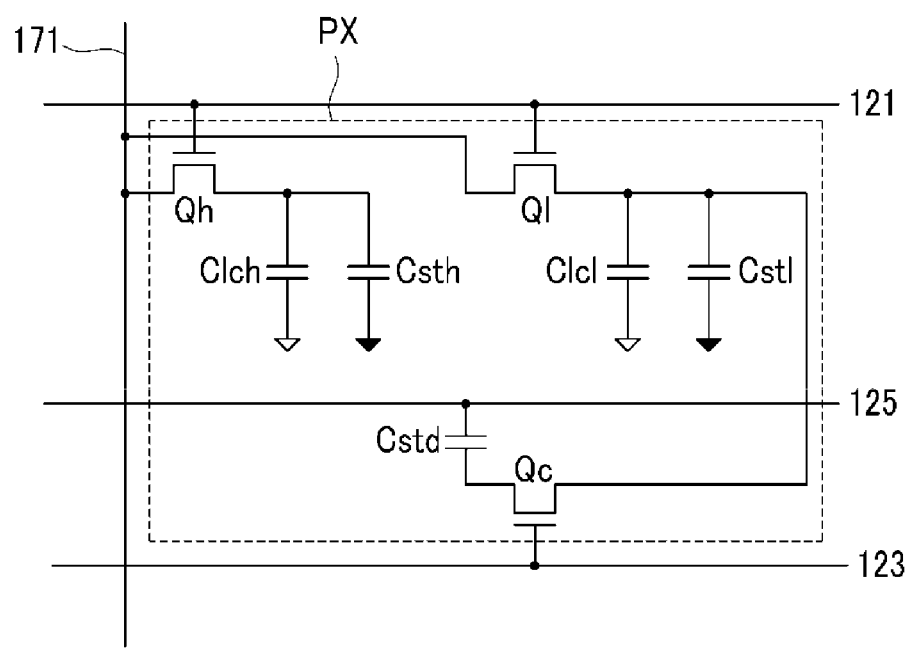
FIG. 5 is an equivalent circuit diagram of one pixel of a liquid crystal display according to an exemplary embodiment of the present invention.

FIG. 5 is an equivalent circuit diagram of one pixel of a liquid crystal display according to an exemplary embodiment.

Referring to FIG. 5, a liquid crystal display shown in FIG. 1 and FIG. 2 includes signal lines including a gate line 121, a storage electrode line 125, a step-down gate line 123, and a data line 171, and a pixel PX connected to the signal lines.

The pixel PX includes the first, second, and third thin film transistors Qh, Ql, Qc, the first and second liquid crystal capacitors Clch and Clcl, the first and second storage capacitors Csth and Cstl, and a step-down capacitor Cstd.

The first and second thin film transistors Qh and Ql are respectively connected to the gate line 121 and the data line 171, and the third thin film transistor Qc is connected to the step-down gate line 123.

The first and second thin film transistors Qh and Ql each have three terminal elements provided in the lower panel 100 including a control terminal connected to the gate line 121, an input terminal connected to the data line 171, and an output terminal connected to the first and second liquid crystal capacitors Clch and Clcl and the first and second storage capacitors Csth and Cstl.

The third thin film transistor Qc has three terminal elements provided in the lower panel 100, including a control terminal connected to the step-down gate line 123, an input terminal connected to the second liquid crystal capacitor Clcl, and an output terminal connected to the step-down capacitor Cstd.

The first and second liquid crystal capacitors Clch and Clcl are formed by overlapping the first and second sub-pixel electrodes 191h and 191l connected to the first and second switching elements Qh and Ql and the common electrode 270 of the upper panel 200 to each other. The first and second storage capacitors Csth and Cstl are formed by overlapping the storage electrode line 125 as well as the storage electrode 129 and the first and second sub-pixel electrodes 191h and 191l.

The step-down capacitor Cstd is connected to the output terminal of the third thin film transistor Qc and the storage electrode line 125, and the storage electrode line 125 provided in the lower panel 100 and the output terminal of the third thin film transistor Qc overlap each other via the insulator.

First, if the gate line 121 is applied with the gate-on voltage Von, the first and second thin film transistors Qh and Ql are turned on.

Accordingly, the data voltage applied to the data line 171 is simultaneously applied to the first and second sub-pixel electrodes 191h and 191l through the turned-on first and second switching elements Qh and Ql. The first and second liquid crystal capacitors Clch and Clcl are charged by a difference between the common voltage Vcom of the common electrode 270 and the voltage of the first and second sub-pixel electrodes 191h and 191l such that the charging voltage of the first liquid crystal capacitor Clch is the same as the charging voltage of the second liquid crystal capacitor Clcl. Here, the step-down gate line 123 is applied with the gate-off voltage Voff.

Next, the gate-off voltage Voff is applied to gate line 121, and simultaneously the gate-on voltage Von is applied to step-down gate line 123, the first and second switching elements Qh and Ql connected to the gate line 121 are turned off, and the third switching element Qc is turned on. Accordingly, the charges of the second subpixel electrode 191l connected to the output terminal of the second switching element Ql flows in the step-down capacitor Cstd such that the voltage of the second liquid crystal capacitor Clcl is decreased.

In an example of the case in which the liquid crystal display according to the present exemplary embodiment is driven by frame inversion, when the data line 171 has a positive data voltage with respect to the common voltage Vcom in the present frame, the negative charges are gathered in the step-down capacitor Cstd after the previous frame is finished. In the present frame, if the third switching element Qc is turned on, the positive charge of the second sub-pixel electrode 191l flows in the step-down capacitor Cstd through the third switching element Qc such that the positive charges are gathered in the step-down capacitor Cstd and the voltage of the second liquid crystal capacitor Clcl is decreased. Next, in the next frame, the third switching element Qc is turned on in the state that the negative charges are charged in the second sub-pixel electrode 191l such that the negative charges of the second sub-pixel electrode 191l flow in the step-down capacitor Cstd such that the negative charges are gathered in the step-down capacitor Cstd, and the voltage of the second liquid crystal capacitor Clcl is also decreased.

As described above, according to the present exemplary embodiment, the charging voltage of the second liquid crystal capacitor Clcl is lower than the charging voltage of the first liquid crystal capacitor Clch regardless of the polarity of the data voltage. Accordingly, the charging voltages of the first and second liquid crystal capacitors Clch and Clcl are different, such that the lateral view of the liquid crystal display may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organic layer composition comprising
   a binder formed by copolymerizing compounds comprising a first group and a second group, wherein the first group includes an acryl-based compound and the second group includes a compound without a —COO— group, wherein the second group includes at least one compound selected from the group consisting of an imide, an acid dianhydride including an aliphatic ring, norbornene, a silicon-based compound, and a novolak-based compound, wherein the concentration of the compound corresponding to the second group included in the binder is in the range of 5 wt % to 80 wt %.

2. The organic layer composition of claim 1, wherein the first group includes at least one of compound selected from the group consisting of Formula 1, 2, 3, 4 and 5,

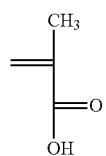

1

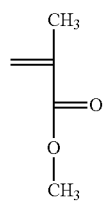

2

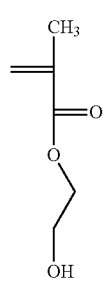

3

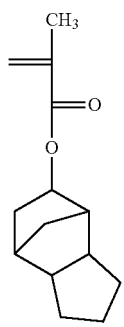

4

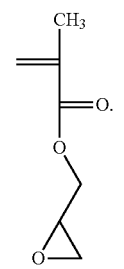

5

3. An organic layer composition comprising a binder formed by copolymerizing compounds comprising a first group and a second group, wherein the first group includes an acryl-based compound and the second group includes a compound without a —COO— group, wherein the second group includes at least one compound selected from the group consisting of an imide, an acid dianhydride including an aliphatic ring, norbornene, a silicon-based compound, and a novolak-based compound, wherein the first group includes at least one compound selected from the group consisting of Formula 1, 2, 3, 4, and 5,

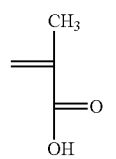

1

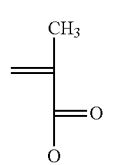

2

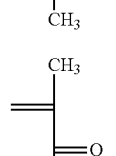

3

4

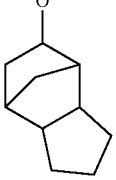

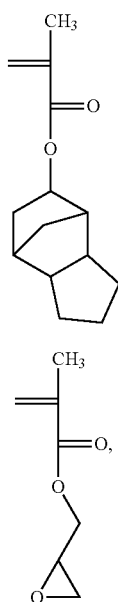

and, wherein
the acid dianhydride including the aliphatic ring includes at least one of compound selected from the group consisting of Formula 6, 7 and 8:

6

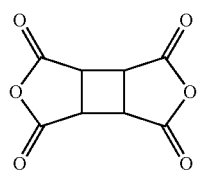

7

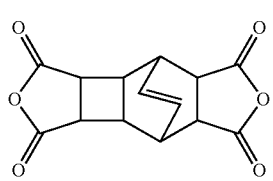

8

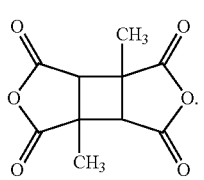

4. The organic layer composition of claim 3, wherein
when the norbornene is polymerized, a unit monomer of the binder includes at least one compound selected from the group consisting of Formula 9, 10, 11, and 12:

9

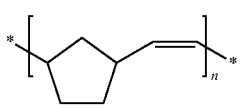

10

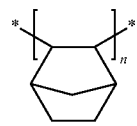

11

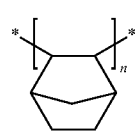

12

5. An organic layer composition comprising a binder formed by copolymerizing compounds comprising a first group and a second group, wherein the first group includes an acryl-based compound and the second group includes a compound without a —COO— group, wherein the second group includes at least one compound selected from the group consisting of an imide, an acid dianhydride including an aliphatic ring, norbornene, a silicon-based compound, and a novolak-based compound,
wherein the first group includes at least one compound selected from the group consisting of Formula 1, 2, 3, 4, and 5,

1

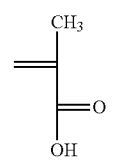

2

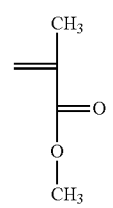

3

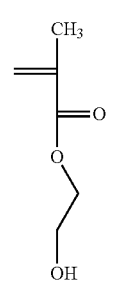

-continued

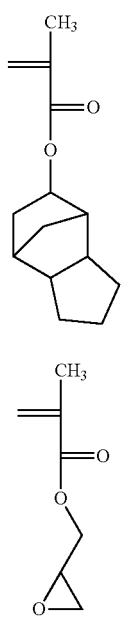

wherein the acid dianhydride including the aliphatic ring includes at least one compound selected from the group consisting of Formula 6, 7 and 8:

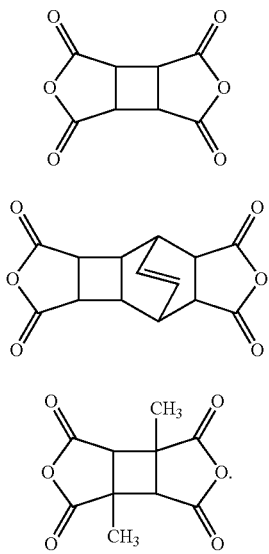

wherein when the norbornene is polymerized, a unit monomer of the binder includes at least one compound selected from the group consisting of Formula 9, 10, 11, and 12:

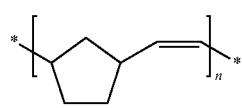

-continued

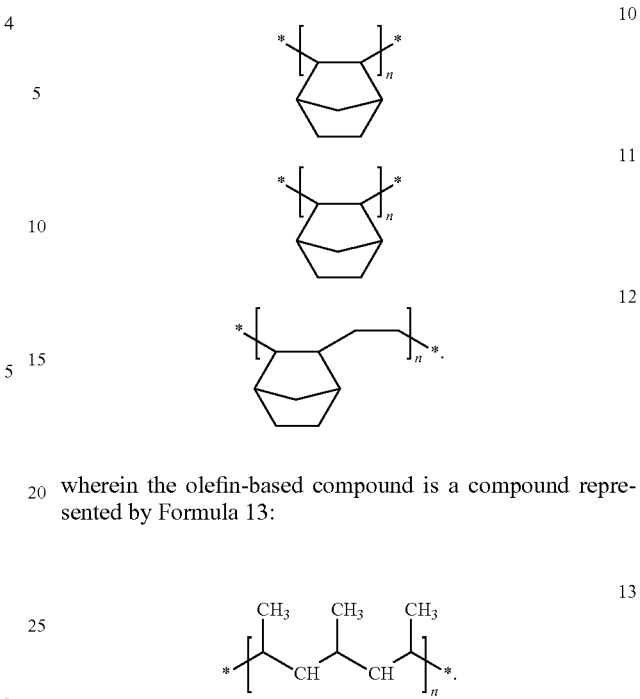

wherein the olefin-based compound is a compound represented by Formula 13:

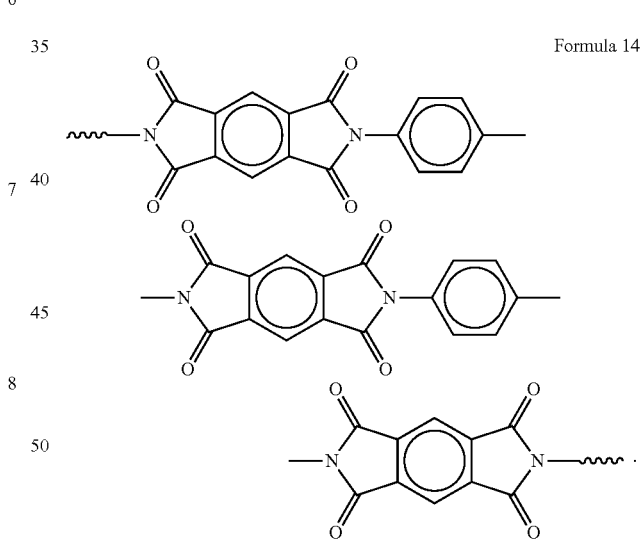

6. The organic layer composition of claim 5, wherein the imide comprises a compound represented by Formula 14:

Formula 14

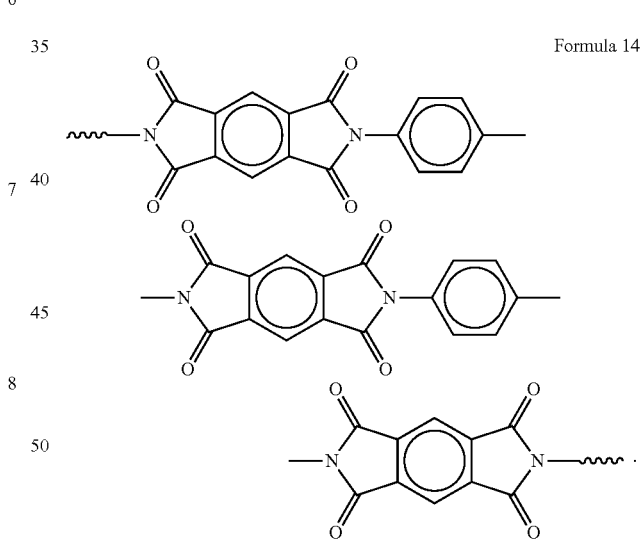

7. The organic layer composition of claim 6, wherein the novolak-based compound includes at least one compound selected from the group consisting of cresol, xylenol, and trimethylphenol.

8. A liquid crystal display comprising:
a first substrate;
a second substrate facing the first substrate;
a thin film transistor disposed on the first substrate;
an organic layer disposed on the thin film transistor;
a pixel electrode disposed on the organic layer; and
a common electrode disposed on the second substrate, wherein the organic layer includes a light absorption agent added to a binder including an acryl-based copolymer, and the light absorption agent includes at least one compound selected from the group consisting of a cinnamic acid derivative, a benzophenone derivative, an oxalanilide derivative, a benzotriazole derivative, and a triazine derivative, and the light absorption agent includes at least one compounds selected from the group consisting of Formula 14, 15, 16, 17 and 18:

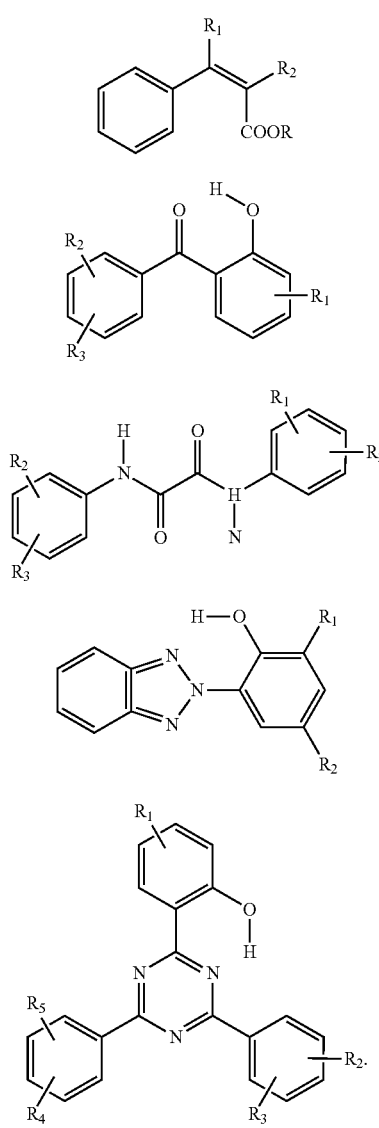

9. The liquid crystal display of claim 8, further comprising a liquid crystal layer interposed between the first substrate and the second substrate, and having a liquid crystal and an alignment polymer, wherein the alignment polymer is formed by irradiating the liquid crystal and an alignment aid agent.

10. The liquid crystal display of claim 9, wherein the light absorption agent absorbs the light irradiated to form the alignment polymer.

11. The liquid crystal display of claim 10, wherein the light absorption agent converts the absorbed light into heat through a reversible reaction.

12. The liquid crystal display of claim 10, wherein the energy of the light irradiated to the liquid crystal and the alignment aid agent is in the range of 30 $J/cm^2$ to 100 $J/cm^2$.

13. The liquid crystal display of claim 8, further comprising a color filter disposed on the first substrate, and the organic layer covers the color filter and the thin film transistor.

14. The liquid crystal display of claim 13, wherein the color filter includes a light absorption agent, and the light absorption agent comprises at least one compound selected from the group consisting of a cinnamic acid derivative, a benzophenone derivative, an oxalanilide derivative, a benzotriazole derivative, and a triazine derivative.

15. The liquid crystal display of claim 14, further comprising a black matrix disposed on the first substrate.

16. The liquid crystal display of claim 15, wherein the black matrix includes a light absorption agent, the light absorption agent includes at least one compound selected from the group consisting of a cinnamic acid derivative, a benzophenone derivative, an oxalanilide derivative, a benzotriazole derivative, and a triazine derivative.

17. The liquid crystal display of claim 8, wherein the pixel electrode includes a plurality of small slits.

18. The liquid crystal display of claim 8, wherein the binder is formed by copolymerizing compounds comprising a first group and a second group, wherein the first group includes an acryl-based compound and the second group includes a compound without a —COO— group.

19. The liquid crystal display of claim 18, wherein the first group comprises at least one of compounds selected from the group consisting of Formula 1, 2, 3, 4, and 5,

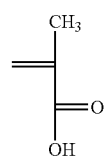

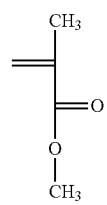

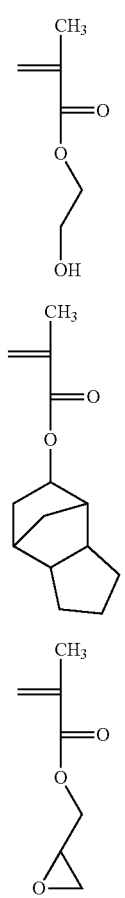

and the second group includes at least one compound selected from the group consisting of styrene, an imide, an acid dianhydride including an aliphatic ring, norbornene, an olefin-based compound, a silicon-based compound, and a novolak-based compound.

20. A liquid crystal display comprising:
a first substrate;
a second substrate facing the first substrate;
a thin film transistor disposed on the first substrate;
an organic layer disposed on the thin film transistor;
a pixel electrode disposed on the organic layer;
a common electrode disposed on the second substrate; and
a color filter disposed on the first substrate,
wherein the organic layer covers the color filter and the thin film transistor,
wherein the organic layer includes a binder formed by copolymerizing compounds comprising a first group and a second group, wherein the first group includes an acryl-based compound and the second group includes a compound without a —COO— group, wherein the second group includes at least one compound selected from the group consisting of an imide, an acid dianhydride including an aliphatic ring, norbornene, a silicon-based compound, and a novolak-based compound,
wherein the color filter comprises a binder formed by copolymerizing compounds comprising a first group and a second group, wherein the first group includes an acryl-based compound and the second group includes a compound without a —COO— group.

21. The liquid crystal display of claim 20, wherein the first group includes at least one of compounds selected from the group consisting of Formula 1, 2, 3, 4, and 5,

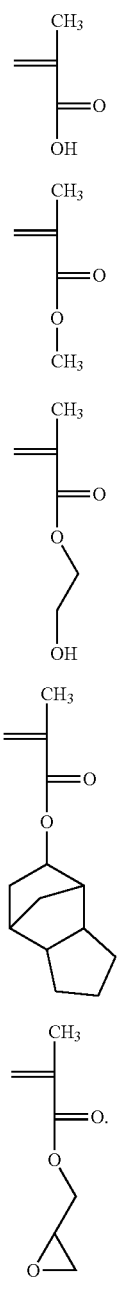

22. The liquid crystal display of claim 21, further comprising
a liquid crystal layer interposed between the first substrate and the second substrate and including liquid crystal and an alignment polymer,
wherein the alignment polymer is formed by irradiating the liquid crystal and an alignment aid agent.

23. The liquid crystal display of claim 20, further comprising
a black matrix disposed on the first substrate.

24. The liquid crystal display of claim 23, wherein the black matrix comprises a binder formed by copolymerizing compounds comprising a first group and a second group, wherein the first group includes an acryl-based compound and the second group includes a compound without a —COO— group.

25. The liquid crystal display of claim 20, wherein the pixel electrode comprises a plurality of small slits.

* * * * *